(12) United States Patent
Boehme

(10) Patent No.: US 10,362,173 B2
(45) Date of Patent: Jul. 23, 2019

(54) WEB REAL-TIME COMMUNICATION FROM AN AUDIOVISUAL FILE

(71) Applicant: Sorenson IP Holdings, LLC, Salt Lake City, UT (US)

(72) Inventor: Kenneth Boehme, South Jordan, UT (US)

(73) Assignee: Sorenson IP Holdings, LLC, Salt Lake City, UT (US)

( * ) Notice: Subject to any disclaimer, the term of this patent is extended or adjusted under 35 U.S.C. 154(b) by 155 days.

(21) Appl. No.: 15/611,489

(22) Filed: Jun. 1, 2017

(65) Prior Publication Data

US 2018/0324303 A1 Nov. 8, 2018

Related U.S. Application Data

(60) Provisional application No. 62/501,915, filed on May 5, 2017.

(51) Int. Cl.
*G06F 15/16* (2006.01)
*H04M 3/53* (2006.01)
(Continued)

(52) U.S. Cl.
CPC ...... *H04M 3/5315* (2013.01); *H04L 12/1831* (2013.01); *H04L 51/066* (2013.01);
(Continued)

(58) Field of Classification Search
CPC ........ H04M 3/5315; H04M 2203/4509; H04L 12/1831; H04L 51/066; H04L 51/10;
(Continued)

(56) References Cited

U.S. PATENT DOCUMENTS 9,525,830 B1 12/2016 Roylance et al.
9,820,120 B2 * 11/2017 deCharms ............. H04W 4/021
(Continued)

FOREIGN PATENT DOCUMENTS

WO 2013144982 A1 10/2013
WO 2016150213 A1 9/2016

OTHER PUBLICATIONS

International Search Report and Written Opinion as issued in connection with International Patent Application No. PCT/US2018/028937, dated Jul. 18, 2018.
(Continued)

*Primary Examiner* — Kristie D Shingles
(74) *Attorney, Agent, or Firm* — Maschoff Brennan

(57) ABSTRACT

According to one or more aspects of the present disclosure, operations may include accessing an audiovisual file of an audiovisual presentation that includes an audio track that includes audio data and a video track that includes video data. The operations may also include generating an audio stream of the audio data that mimics the audio data as being sequentially obtained from audio being captured in real-time. Further, the operations may include generating a video stream of the video data that mimics the video data as being sequentially obtained from video being captured in real-time. Moreover, the operations may include providing the audio stream and the video stream to a system Web Real-Time Communication (WebRTC) client of a system. In addition, the operations may include communicating, from the system WebRTC client, the audio stream and the video stream to a user-device WebRTC client of a user device using WebRTC protocols.

20 Claims, 6 Drawing Sheets

(51) Int. Cl.
*H04L 12/18* (2006.01)
*H04L 12/58* (2006.01)
*H04L 29/06* (2006.01)
*H04L 29/08* (2006.01)

(52) U.S. Cl.
CPC .............. *H04L 51/10* (2013.01); *H04L 51/24* (2013.01); *H04L 65/1069* (2013.01); *H04L 65/1083* (2013.01); *H04L 65/608* (2013.01); *H04L 67/02* (2013.01); *H04M 2203/4509* (2013.01)

(58) Field of Classification Search
CPC . H04L 51/24; H04L 65/1069; H04L 65/1083; H04L 65/608; H04L 67/02
USPC ........................................................ 709/231
See application file for complete search history.

(56) References Cited

U.S. PATENT DOCUMENTS

| | | |
|---|---|---|
| 2007/0053346 A1 | 3/2007 | Bettis et al. |
| 2008/0178094 A1 | 7/2008 | Ross |
| 2009/0187957 A1 | 7/2009 | Avkarogullari |
| 2014/0368601 A1* | 12/2014 | deCharms ............. H04W 4/021 348/14.02 |
| 2015/0304379 A1 | 10/2015 | Ezell et al. |
| 2015/0341528 A1 | 11/2015 | Ren |
| 2016/0028790 A1 | 1/2016 | Eriksson et al. |
| 2016/0057173 A1 | 2/2016 | Singman et al. |
| 2016/0112473 A1 | 4/2016 | Labranche et al. |
| 2017/0026684 A1 | 1/2017 | Shan et al. |
| 2017/0041406 A1 | 2/2017 | Lawson et al. |

OTHER PUBLICATIONS

Singh et al., "Building Communicating Web Applications Leveraging Endpoints and Cloud Resource Service", IEEE International Conference on Cloud Computing (IEEE Cloud), Jun.-Jul. 2013, 8 pages.

Fernandez et al., "Kurento: a media server technology for convergent WWW/mobile real-time multimedia commmunications supporting WebRTC", http://ieeexplore.ieee.org/abstract/document/6583507/, Jun. 2013, 3 pages.

Nurminen et al., "P2P Media Streaming with HTML5 and WebRTC", https://pdfs.semanticscholar.org/3ec3/25bdfeed455976be4e7c14507b15e5340e49.pdf, retrieved on Mar. 8, 2017, 2 pages.

* cited by examiner

WEB REAL-TIME COMMUNICATION FROM AN AUDIOVISUAL FILE

CROSS-REFERENCE TO RELATED APPLICATION

This application claims priority to U.S. Patent Provisional Application Ser. No. 62/501,915, filed May 5, 2017, the contents of which are hereby incorporated herein by this reference in their entirety.

FIELD

The embodiments discussed in the present disclosure are related to Web Real-time Communication (WebRTC) from an audiovisual file.

BACKGROUND

Web Real-time Communication (WebRTC) systems and protocols are configured to allow real-time peer-to-peer audiovisual communication sessions between electronic devices. For example, during an audiovisual communication session, a first electronic device may be configured to capture audio of a first user (e.g., via a microphone) to generate audio data associated with the audiovisual communication session. Further, during the audiovisual communication session, the first electronic device may also be configured to capture a series of images of the first user as video (e.g., via a video camera) to generate video data associated with the audiovisual communication session. An audio stream and a video stream may be generated using the audio data and the video data, respectively, as the audio and video are being captured (e.g., in real-time). The first electronic device may also include a first WebRTC client that may be configured to receive the audio stream and the video stream. The first WebRTC client may communicate the audio stream and the video stream to a second WebRTC client of a second electronic device that may be part of the video communication session. The second WebRTC client may be configured to facilitate the presentation of the audio and video associated with the audio stream and the video stream in response to receiving the audio stream and the video stream.

The subject matter claimed in the present disclosure is not limited to embodiments that solve any disadvantages or that operate only in environments such as those described above. Rather, this background is only provided to illustrate one example technology area where some embodiments described herein may be practiced.

SUMMARY

According to one or more aspects of the present disclosure, operations related to generating audio and video streams from an audiovisual file for use with Web Real-time Communications (WebRTC) are disclosed. In some embodiments, the operations may include accessing an audiovisual file of an audiovisual presentation that includes an audio track that includes audio data of audio of the audiovisual presentation and a video track that includes video data of video of the audiovisual presentation. The operations may also include generating, from the audio track of the audiovisual file, an audio stream of the audio data that mimics the audio data of the video mail file as being sequentially obtained from audio being captured in real-time. Further, the operations may include generating, from the video track of the audiovisual presentation, a video stream of the video data that mimics the video data of the video mail file as being sequentially obtained from video being captured in real-time. Moreover, the operations may include providing the audio stream and the video stream to a system Web Real-Time Communication (WebRTC) client of a system. In addition, the operations may include communicating, from the system WebRTC client, the audio stream and the video stream to a user-device WebRTC client of a user device using WebRTC protocols such that the user device is able to present the audiovisual presentation based on the audio stream and the video stream.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
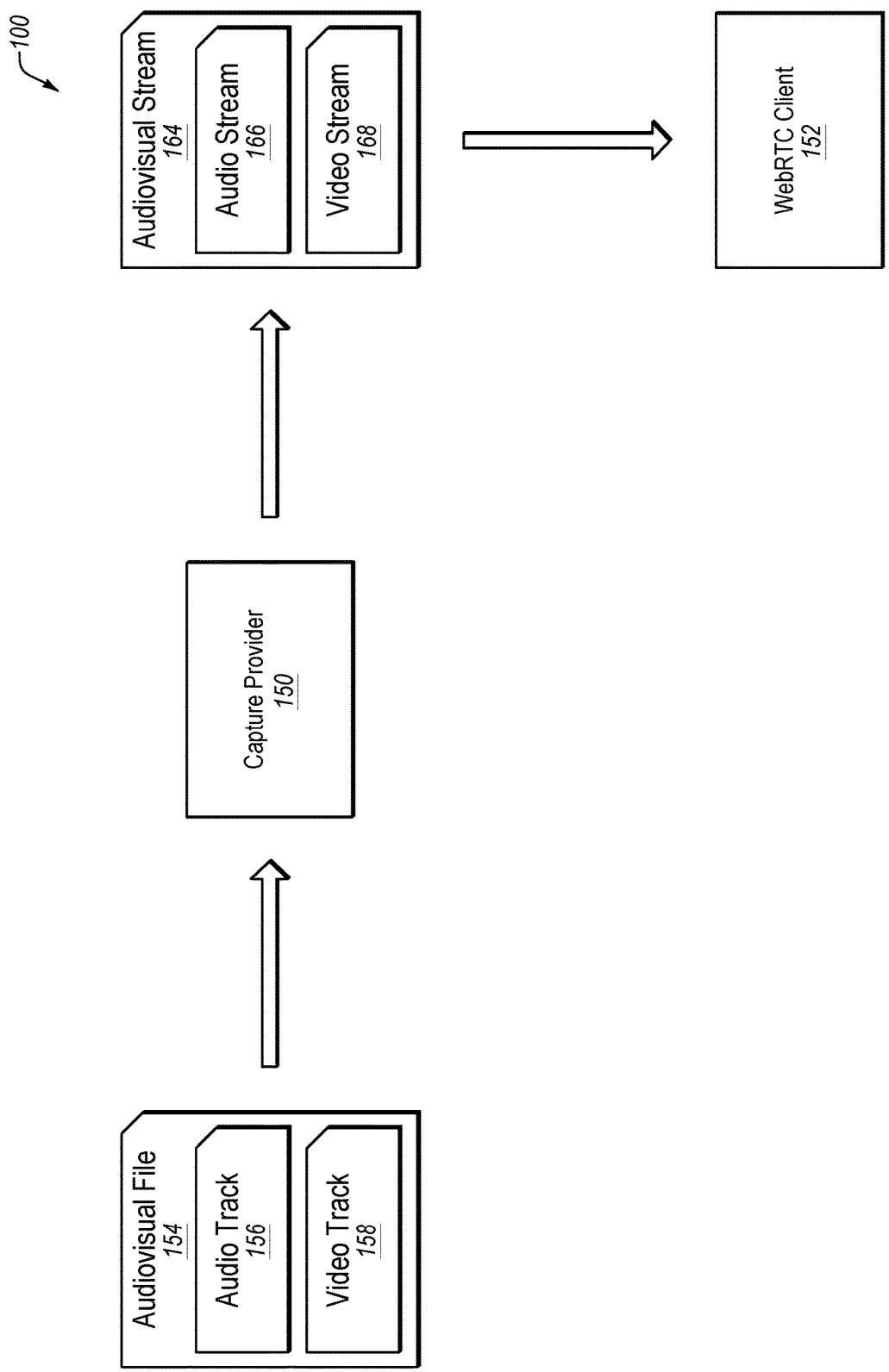
FIG. 1 illustrates an example environment related to performing Web Real-time Communications (WebRTC) with respect to an audiovisual file.

Web Real-time Communication (WebRTC) communication systems and protocols are configured to operate with respect to communicating audio streams and video streams between electronic devices for real-time communications such as an audiovisual communication session between users. Typically these communications include generation of the audio and video streams in real-time as the associated audio and video are being captured (e.g., by a microphone and a video camera) and corresponding audio and video data are being generated.

In the present disclosure, use of the term "video" may refer to a series of images that, when presented in succession, provide the illusion of movement. Additionally, the series of images of the video may be referred to as "frames" in which each image may be a frame. In some instances, audio may correspond to the frames of a video. In these or other instances, reference to an "audiovisual presentation" may refer to a combination of the audio and the video that corresponds to the audio. It is noted that the term "video" is often used to refer to a combination of audio and video as referred to in the present disclosure as an "audiovisual presentation." However, in the present disclosure "audiovisual presentation" is used instead of "video" to help differentiate between instances in which audio and a series of images are combined (e.g., audiovisual presentation) and instances in which there is just the series of images (e.g., video).

"Audio data" as used in the present disclosure may correspond to audio and may include any appropriate type of data or information that may be used to represent and/or replicate audio to which the audio data may correspond. Similarly, "video data" as used in the present disclosure may correspond to a sequence of frames and may include any appropriate type of data or information that may be used to represent and/or replicate the frames to which the video data may correspond. Further, in the present disclosure reference to an "audiovisual file" may refer to a file that includes a combination of both video data and corresponding audio data. It is noted, that the term "video file" is often used to refer to files that include a combination of audio data and video data, but to help provide differentiations, the term "audiovisual file" used in the present disclosure.

Moreover, reference to operations or the like occurring in "real-time" may refer to operations occurring at the present time or relatively close to the present time, such as with less than 0.1, 0.5, 1, 2, 3, 5, 10, 15, or 20 second delay. For example, reference to "sequentially obtaining audio data from audio being captured in real-time" may refer to a currently occurring time period during which audio data may be obtained in a sequential manner based on audio that is being captured (e.g., by a microphone) during the time period, give or take delays that may occur in the processing.

In some instances, it may be advantageous to use WebRTC communication systems and protocols in situations in which the audio data and video data have previously been generated and are stored in an audiovisual file as an audio track and a video track as opposed to being streamed in conjunction with their generation. For example, transcription systems may be used to provide text transcriptions to supplement voice conversations occurring between hearing-impaired users and others during a communication session such as a telephone, audiovisual, or other communication. In these or other instances, a transcription system may provide video mail messaging services to its users in which audiovisual recordings may be generated as video mail messages. In some embodiments, the video mail messages may be stored by the transcription system as audiovisual files that may be communicated to user devices of the users as video mail messages.

In some instances, the transcription system may also generate and provide text transcriptions of the audio of the video mail messages. Additionally, keeping the audio data and video data of the video mail messages separate during the communication of the video mail messages to the user devices may help facilitate the generation of text transcriptions with respect to the video mail messages. WebRTC systems and protocols allow for keeping the video data and the audio data separate in the communication of the video mail messages. Further, WebRTC systems and protocols allow for the video mail messages to be presented by the user devices without having to store the video mail messages locally on the user devices. However, as indicated above, WebRTC systems and protocols operate based on receiving audio and video streams and not entire audiovisual files.

Therefore, according to one or more aspects of the present disclosure, one or more operations may be performed to allow for the communication of audio data and video data included in an audio track and a video track of an audiovisual file via WebRTC systems and protocols. For example in some embodiments, the audiovisual file may be accessed and an audio stream may be generated from the audio track of the audiovisual file. Additionally, a video stream may be generated from the video track of the audiovisual file. In these or other embodiments, the video stream and the audio stream may be presented as separate streams to a system WebRTC client of a system that accesses the audiovisual file. The system WebRTC client may be configured to communicate the video stream and the audio stream to a user-device WebRTC client of a user device using WebRTC protocols such that the user device is able to present the audiovisual presentation of the audiovisual file based on the audio stream and the video stream. Therefore, some embodiments of the present disclosure may allow for the use of WebRTC systems and protocols to communicate an audiovisual presentation of an audiovisual file.

Additionally or alternatively, one or more embodiments of the present disclosure may include a video mail messaging service. In these or other embodiments, the video mail messaging service may include a transcription system that may provide text transcriptions of audio of the video mail messages.

For example, in some embodiments, the transcription system may be configured to receive, from a first user device of a first user, a video mail file of a video mail message. The video mail message may be designated as being for a second user and may include an audio track of audio of the video mail message and a video track of video of the video mail message. In some embodiments, the transcription system may store the video mail file in a database.

Additionally or alternatively, the transcription system may receive, from a second user device of the second user, a request to view the video mail message. In these or other embodiments, the transcription system may be configured to perform one or more presentation operations in response to receiving the request to view the video mail message. The presentation operations may allow the second user device to present the video mail message. In some embodiments, the presentation operations may include generating, from the audio track of the video mail file stored in the database, an audio stream of audio data included in the audio track. In some embodiments the audio stream may be generated to mimic the audio data of the video mail message as being sequentially obtained from audio being captured (e.g., by a microphone) in real-time. The presentation operations may also include generating, from the video track of the video mail file stored in the database, a video stream of video data included in the video track. In some embodiments, the video stream may be generated to mimic the video data of the video mail message as being sequentially obtained from images being captured (e.g., by a video camera) in real-time.

The presentation operations may include providing the audio stream and the video stream to a system Web Real-Time Communication (WebRTC) client of the transcription system. Additionally, the presentation operations may include communicating, from the system WebRTC client, the audio stream and the video stream to a user-device WebRTC client of the second user device using WebRTC protocols such that the second user device is able to play the video mail message based on the audio stream and the video stream.

In these or other embodiments, the transcription system may receive the audio stream back from the second user device and may generate text transcriptions of the audio of the video mail message based on the audio stream. The transcription system may also provide the text transcriptions to the second user device while the second user device is presenting the video mail message for presentation of the text transcriptions in real-time with the presentation of the video mail message.

Turning to the figures, FIG. 1 illustrates an example environment 100 related to performing WebRTC communications with respect to an audiovisual file. The environment 100 may be arranged in accordance with at least one embodiment described in the present disclosure. In some embodiments, the environment 100 may include an audiovisual file 154, a capture provider 150 configured to generate an audiovisual stream 164 and configured to provide the audiovisual stream 164 to a WebRTC client 152.

The audiovisual file 154 may be any appropriate collection of data formatted in any appropriate manner to represent an audiovisual presentation. By way of example, the audiovisual file 154 may be an MPEG-4 Part 14 (MP4) file, MPEG-1 file, MPEG-2 file, M4V file, SVI file, 3GPP file, 3GPP2 file, Material Exchange Format (MXF) file, ROQ file, Nullsoft Streaming Video (NSV) file, Flash Video (FLV) file, or any other suitable audiovisual file type.

In some embodiments, the audiovisual file 154 may include an audio track 156 that may include audio data that may correspond to audio of the audiovisual file 154. Additionally or alternatively, the audiovisual file 154 may include a video track 158 that may include video data that may correspond to video of the audiovisual file.

In some embodiments, the audio track 156 and the video track 158 may each include one or more timestamps. The timestamps may indicate which audio data corresponds to which video data with respect to the audio and video of the corresponding audiovisual presentation. For example, an audio time stamp of the audio track 156 may indicate that particular audio data corresponds to a time "t1" of the corresponding audiovisual presentation. Additionally, a video time stamp of the video track 158 may indicate that particular video data also corresponds to time "t1" of the corresponding audiovisual presentation. The audio and video timestamps may thus indicate that the particular audio data corresponds to the particular video data in that the audio of the particular audio data goes with the frames of the particular video data.

The audiovisual stream 164 may be a stream of the data included in the audiovisual file 154. For example, the audiovisual stream 164 may include an audio stream 166 that may be a stream of the audio data included in the audio track 156. Additionally, the audiovisual stream 164 may include a video stream 168 that may be a stream of the video data included in the video track 158. As indicated above, the audio stream 166 and the video stream 168 may be separate in the audiovisual stream 164 and reference to the audiovisual stream 164 may merely indicate that the video stream 168 and the audio stream 166 are being provided or communicated at substantially the same time.

In some embodiments, the audio stream 166 and the video stream 168 may be separate streams. In these or other embodiments, the audiovisual stream 164 may be such that the audio stream 166 and the video stream 168 may be synchronized or substantially synchronized. For example, particular audio data of the audio stream 166 that is provided or received at a particular point in time may correspond to particular video data of the video stream 168 that is provided or received at the particular point in time in that the audio of the particular audio data may be the audio that corresponds to the frames of the particular video data. In some embodiments, the audio stream 166 and the video stream 168 may be synchronized based on the timestamps included in the audio track 156 and the video track 158, as discussed further below.

In the present disclosure, reference to synchronization or substantial synchronization does not require absolute synchronization and allows for a margin of error. The margin of error may vary depending on the ability at a receiving end of the audiovisual stream 164 to reconcile differences in synchronization and/or limits of perception by users. For example, humans typically perceive differences in audio and video timing that are more than 100 milliseconds (ms) apart such that the timing of the providing of or the receiving of the particular audio data and the particular video data may be off with respect to each other by up to 100 ms while also being considered "synchronized" or substantially synchronized.

The capture provider 150 may include computer readable instructions configured to enable a computing device to receive the audiovisual file 154 and to generate the audiovisual stream 164 based on the audiovisual file 154. Additionally or alternatively, the capture provider 150 may be implemented using hardware including a processor, a microprocessor (e.g., to perform or control performance of one or more operations), a field-programmable gate array (FPGA), or an application-specific integrated circuit (ASIC). In the present disclosure, operations described as being performed by the capture provider 150 may include operations that the capture provider 150 may direct a corresponding system to perform.

As mentioned above, in some embodiments, the capture provider 150 may be configured to generate the audiovisual stream 164 based on the audiovisual file 154. For example, in some embodiments, the capture provider 150 may be configured to access the audiovisual file 154 and to extract the audio track 156 and the video track 158 from the audiovisual file 154.

The capture provider 150 may be configured to generate the audio stream 166 based on the audio track 156. In some embodiments, the capture provider 150 may be configured to generate the audio stream 166 by sequentially providing increments of audio data that may be derived from the audio track 156. The increments of audio data may be provided sequentially based on the chronological order of the audio to which the audio data increments correspond. In some embodiments, the chronological order may be determined by the capture provider 150 based on one or more audio timestamps included in the audio track 156 or based on any other sort of indicator as to the order of presentation of the audio data to reproduce the audio of the corresponding audiovisual presentation. Additionally or alternatively, in some embodiments, the capture provider 150 may sequentially provide the increments of audio data in timing increments that may correspond to an amount of time of presentation of audio that corresponds to the increments. In these or other instances, the audio stream 166 may thus mimic the audio data and associated audio of the audio track 156 as being sequentially obtained in real-time (e.g., as being obtained from a microphone as the microphone is capturing the corresponding audio).

By way of example, in some embodiments, the capture provider 150 may obtain a first audio data increment of audio data from the audio track 156 in which the first audio increment may correspond to a first audio portion of the audio of the corresponding audiovisual presentation. The first audio portion may also have a particular presentation or playback time in the corresponding audiovisual presentation such that the first audio increment may be associated with the amount of time of presentation of the first audio portion. For example, the presentation time of the first audio portion may be 20 ms long. In some embodiments, the size of the first audio data increment may be selected based on a particular length of presentation time of the first audio portion. The capture provider 150 may provide the first audio data increment to the WebRTC client 152 in some embodiments.

In some instances, the capture provider 150 may be configured to determine an amount of time that has passed since it provided the first audio data increment to the WebRTC client 152. In some embodiments, in response to determining that a particular amount of time has passed since it provided the first audio data increment to the WebRTC client 152, the capture provider 150 may provide a second audio data increment to the WebRTC client 152. The second audio data increment may correspond to a second audio portion of the audio of the corresponding audiovisual presentation in which the second audio portion may chronologically follow the first audio portion in the audio of the corresponding audiovisual presentation such that the first audio data increment and the second audio data increment may form at least part of the audio stream 166.

In some embodiments, the particular amount of time that has passed since providing the first audio data increment that may trigger the providing of the second audio data increment may correspond to the presentation time of the first audio portion that corresponds to the first audio data increment. For example, in instances in which the presentation time of the first audio portion is 20 ms, the capture provider 150 may provide the second audio data increment to the WebRTC client 152 20 ms, or approximately 20 ms, after providing the first audio data increment to the WebRTC client 152. Therefore, the providing of the first audio data increment and of the second audio data increment may mimic the first audio data increment and the second audio data increment being sequentially obtained in real-time, such as from a microphone or other audio data generating device.

Additionally or alternatively, in some embodiments the audio data increments may be provided in a particular order and after a particular amount of time based on timestamps associated with the audio data increments. In these or other embodiments, the timestamp associated with each of the audio data increments may be provided with the respective audio data increments in the audio stream 166. The inclusion of the timestamps may help maintain synchronization of the audio data and the video data during presentation of the audiovisual presentation.

In some embodiments, the second audio data increment may correspond to a same presentation time as the first audio data increment. Additionally or alternatively, the second audio data increment may correspond to a different presentation time as the first audio data increment.

In these or other embodiments, the size of the second audio data increment may be based on a scheduled transmission interval of the audio data increments, the presentation time that corresponds to the first audio data increment, and/or the amount of time that has passed since providing the first audio data increment to the WebRTC client 152. For example, in instances in which a scheduled transmission interval of the audio data increments is every 20 ms, the size of the second audio data increment may be such that the second audio portion has a 20 ms presentation time. As another example, in embodiments with a scheduled transmission interval of 20 ms, for one reason or another, 40 ms may have passed since the first audio data increment with a corresponding presentation time of 20 ms was provided to the WebRTC client 152. In some of these instances, the size of the second audio data increment may be such that the second audio portion has a 40 ms presentation time to make up for the gap in time and to place the audio stream 166 in closer adherence to the scheduled transmission interval.

Additionally or alternatively, in some embodiments, the sizes of the audio data increments that may form the audio stream 166 may be based on properties of a remote WebRTC client and associated remote system (described in further detail below) that may receive the audio stream 166 from the WebRTC client 152. For example, the remote WebRTC client and associated remote system may have an audio buffer of a particular size that may receive the audio stream 166. The sizes of the audio data increments may be selected such that more information than the audio buffer can handle at a particular point in time may not be received by the audio buffer.

In these or other embodiments, the sizes of the audio data increments may be based on the size of discrete portions of the audio data that together may form the audio track 156. For example, in some embodiments, the audio track 156 may include a series of discrete "audio frames" that may correspond to 1, 5, 10, 20, 30, 40, 50, 70, or 100 ms worth of audio and each audio frame may be used as an audio data increment.

The capture provider 150 may be configured to generate the video stream 168 based on the video track 158. In some embodiments, the capture provider 150 may be configured to generate the video stream 168 by sequentially providing increments of video data that may be derived from the video track 158. The increments of video data may be provided sequentially based on the chronological order of the frames to which the video data increments correspond. In some embodiments, the chronological order may be determined by the capture provider 150 based on one or more video timestamps included in the video track 158 or based on any other sort of indicator as to the order of presentation of the video data to reproduce the video of the corresponding audiovisual presentation. Additionally or alternatively, in some embodiments, the capture provider 150 may sequentially provide the increments of video data in timing increments that may correspond to an amount of time of presentation of video that corresponds to the increments. In these or other instances, the video stream 168 may thus mimic the video data and associated video of the video track 158 as being sequentially obtained in real-time (e.g., as being obtained from a video camera as the video camera is capturing the corresponding video).

By way of example, in some embodiments, the capture provider 150 may obtain a first video data increment of video data that is derived from the video track 158 in which the first video data increment may correspond to a first video portion of the video of the audiovisual presentation. The first video portion may also have particular presentation or playback time in the audiovisual presentation such that the first video data increment may be associated with the amount of time of presentation of the first video portion. For example, in some embodiments, the first video data increment may correspond to one frame of the video and the video may have a particular frame rate of 33 frames per second (fps). Based on the frame rate and the first video portion corresponding to one frame, the presentation time of the first video portion may accordingly be approximately 30 ms. Other frame rates and presentation times may also be used.

As indicated above, in some embodiments, the first video data increment may correspond to one or more frames included in the first video portion. In some embodiments, the size of the first video data increment may be selected based on a selected number of frames that may be provided at a time. In some embodiments, the first video data increment may correspond to a single frame. The capture provider 150 may provide the first video data increment to the WebRTC client 152 in some embodiments.

In some instances, the capture provider 150 may be configured to determine an amount of time that has passed since it provided the first video data increment to the WebRTC client 152. In some embodiments, in response to determining that a particular amount of time has passed since it provided the first video data increment to the WebRTC client 152, the capture provider 150 may provide a second video data increment to the WebRTC client 152. The second video data increment may correspond to a second video portion of the video of the audiovisual presentation in which the second video portion may chronologically follow the first video portion in the audiovisual presentation such that the first video data increment and the second video data increment may form at least part of the video stream 168.

In some embodiments, the particular amount of time that has passed since providing the first video data increment that may trigger the providing of the second video data increment may correspond to the presentation time of the first video portion that corresponds to the video audio data increment, which may correspond to the frame rate. For example, in instances in which the presentation time of the first video portion is 30 ms (e.g., in instances in which the first video data and first video portion correspond to one frame with a frame rate of 33 fps), the capture provider 150 may provide the second video data increment to the WebRTC client 152 30 ms, or approximately 30 ms, after providing the first video data increment to the WebRTC client 152. Therefore, the providing of the first video data increment and of the second video data increment may mimic the first video data and the second video data being sequentially obtained in real-time from an image capturing device, such as a camera.

Additionally or alternatively, in some embodiments the video data increments may be provided in a particular order and after a particular amount of time based on timestamps associated with the video data increments. In these or other embodiments, the timestamp associated with each of the video data increments may be provided with the respective video data increments in the video stream 168. The inclusion of the timestamps may help maintain synchronization of the audio data and the video data during presentation of the audiovisual presentation.

In some embodiments, the second video data increment may correspond to a same presentation time as the first video data increment. Additionally or alternatively, the second video data increment may correspond to a different presentation time as the first video data increment.

In these or other embodiments, the size of the second audio data increment may be based on a scheduled transmission interval of the video data increments, the presentation time that corresponds to the first video data increment, and/or the amount of time that has passed since providing the first video data increment to the WebRTC client 152. For example, in instances in which a scheduled transmission interval of the video data increments is every 30 ms, the size of the second video data increment may be such that the second video portion has a 30 ms presentation time. As another example, in embodiments with a scheduled transmission interval of 30 ms, for one reason or another, 60 ms may have passed since the first video data increment with a corresponding presentation time of 30 ms was provided to the WebRTC client 152 in some instances. In some of these instances, the size of the second video data increment may be such that the second video portion has a 60 ms presentation time to make up for the gap in time and to place the video stream 168 in closer adherence to the scheduled transmission interval.

Additionally or alternatively, in some embodiments, the sizes of the video data increments that may form the video stream 168 may be based on properties of the remote WebRTC client and associated remote system (described in further detail below) that may receive the video stream 168 from the WebRTC client 152. For example, the remote WebRTC client and associated remote system may have a video buffer of a particular size that may receive the video stream 168. The sizes of the video data increments may be selected such that more information than the video buffer can handle at a particular point in time may not be received by the video buffer.

In these or other embodiments, the amount of data included in video stream 168 may be reduced by using a key frame coding scheme. For example, in some embodiments, the capture provider 150 may be configured to decode the video data that is included in the video track 158 into raw video data. Based on the raw video data, the capture provider 150 may be configured to generate key frame data that may correspond to a particular frame of the video. The key frame data may include a full amount of information that may be required to construct the particular frame of the video. In some embodiments, a video data increment (e.g., the first video data increment) of the video stream 168 may include the key frame data.

In these or other embodiments, the capture provider 150 may be configured to generate delta frame data based on the key frame data and the raw video data. The delta frame data may include changes that may be made to the key frame data that allow for construction of a subsequent frame of the video mail message that is subsequent to the particular frame that corresponds to the key frame data. The delta frame data may include an incomplete amount of information required to construct the particular frame or the subsequent frame such that the delta frame data may be smaller than the key frame data. In some embodiments, a video data increment subsequent to that which includes the key frame data (e.g., the second video data increment) of the video stream 168 may include the delta frame data.

In some instances, a video data increment that includes delta frame data may not be received at the remote WebRTC client. The loss of the video data increment that includes delta frame data may result in an inability to reconstruct one or more frames that correspond to the delta frame data or frames subsequent to those frames.

In some of these embodiments, the capture provider 150 may be configured to receive a notification of delta frame data not being received. In some embodiments, the capture provider 150 may be configured to generate new key frame data in response to receiving the notification. The new key frame data may correspond to the lost frame that may correspond to the lost delta frame data. The new key frame data may include a full amount of information that may be required to reconstruct the lost frame. In some embodiments, the capture provider 150 may be configured to provide a new video data increment that may include the new key frame data to the WebRTC client 152.

In these or other embodiments, the capture provider 150 may be configured to generate subsequent delta frame data for one or more frames that may be subsequent to the previously lost frame based on the new key frame data. Additionally or alternatively, the capture provider may be configured to provide subsequent video data increments to the WebRTC client 152 that each include subsequent delta frame data of corresponding frames.

In some embodiments, the capture provider 150 may be configured to provide the audiovisual stream 164 to the WebRTC client 152 such that the audio stream 166 and the video stream 168 are provided in a synchronized manner. For example, in some embodiments, the capture provider 150 may be configured to provide audio data increments and video data increments with timestamps that correspond to the same, or approximately the same, points in time in the audiovisual presentation to the WebRTC client 152 at the same or approximately the same time.

The WebRTC client 152 may include computer readable instructions configured to perform operations related to WebRTC communication protocols. Additionally or alternatively, the WebRTC client 152 may be implemented using hardware including a processor, a microprocessor (e.g., to perform or control performance of one or more operations), a field-programmable gate array (FPGA), or an application-specific integrated circuit (ASIC). In some other instances, the WebRTC client 152 may be implemented using a combination of hardware and software. In the present disclosure, operations described as being performed by the WebRTC client 152 may include operations that the WebRTC client 152 may direct a corresponding system to perform.

The WebRTC client 152 may be configured to establish and conduct a WebRTC communication session with a remote WebRTC client that may be included in a remote system that may be remotely located from the environment 100. In some instances, the remote WebRTC client may be a user-device WebRTC client and a user device of a user may be the remote system that includes the user-device WebRTC client. In some embodiments, the WebRTC client 152 may be configured to receive the audio stream 166 from the capture provider 150 and to communicate the audio stream 166 to the remote WebRTC client.

For example, the WebRTC client 152 may be configured to receive, as the audiovisual stream 164, the audio stream 166 and the video stream 168. In some embodiments, the WebRTC client 152 may be configured to receive the audio stream 166 and the video stream 168 as two separate streams. Additionally or alternatively, the separate audio stream 166 and video stream 168 may be synchronized to form the audiovisual stream 164. As indicated above, the audio stream 166 and the video stream 168 may be configured to mimic streams being generated in real-time such that the WebRTC client 152 is able to receive and communicate the associated audio and video data.

The WebRTC client 152 may communicate the audiovisual stream 164 (e.g., the synchronized but separate audio stream 166 and video stream 168) to the remote WebRTC client. The remote WebRTC client may be configured to receive the audiovisual stream 164 and to communicate the audio and video data included in the audiovisual stream 164 to the appropriate elements of the remote system such that the remote system is able to reproduce and present the audiovisual presentation of the audiovisual file 154.

Therefore, the environment 100 may be configured to perform operations with respect to the audiovisual file 154 to enable the communication and sharing of the audiovisual presentation associated with the audiovisual file 154 using WebRTC systems and protocols. Modifications, additions, or omissions may be made to the environment 100 without departing from the scope of the present disclosure. For example, the environment 100 may include other elements than those specifically listed. Additionally, the capture provider 150 and the WebRTC client 152 are illustrated and described as separate elements to facilitate the description of operations that may be performed within the environment 100. However, in some embodiments, the capture provider 150 and the WebRTC client 152 may be combined into the same device or module.

Figure 2:
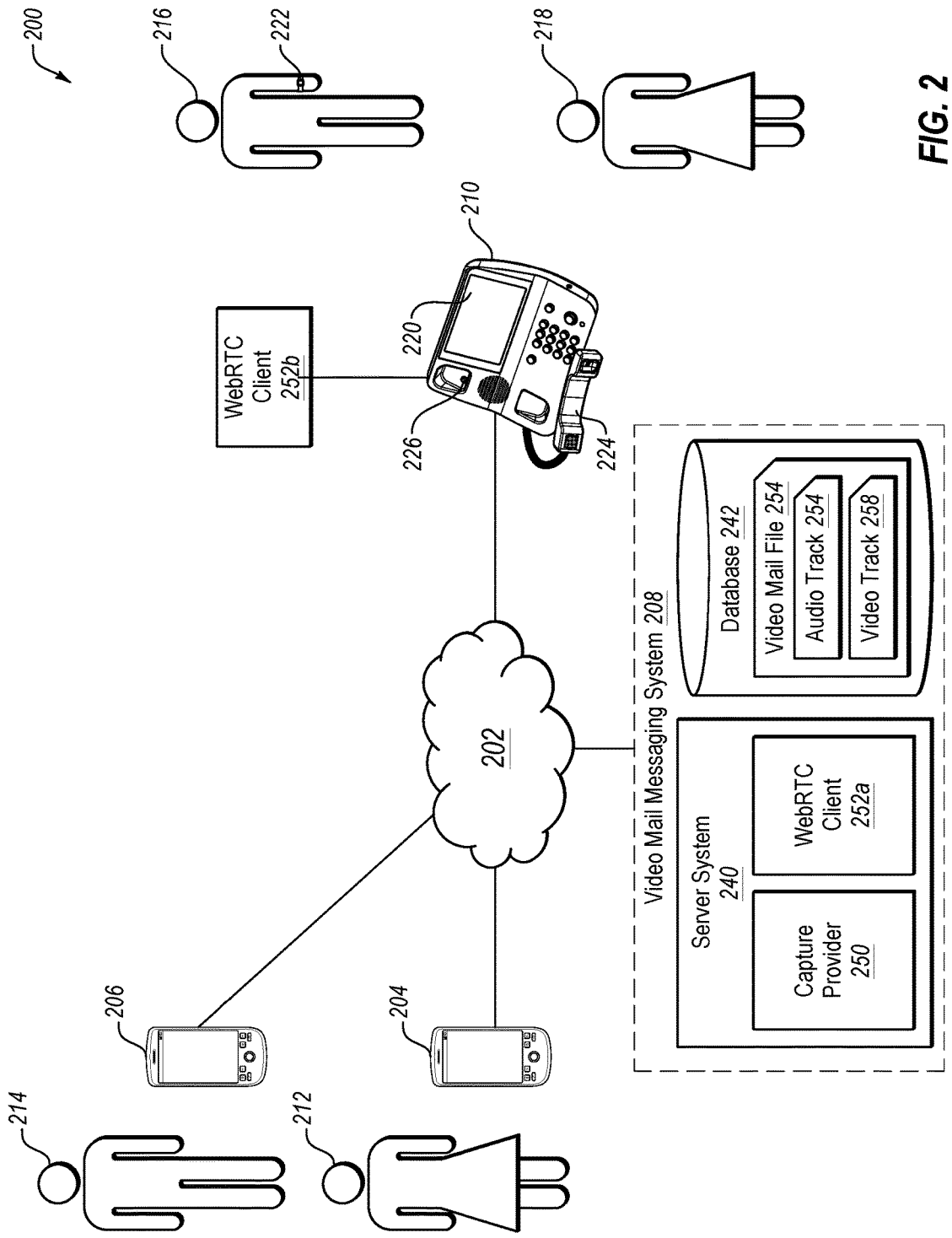
FIG. 2 illustrates an example communication system configured to perform video mail messaging services.

FIG. 2 illustrates an example communication system 200 configured to perform video mail messaging services. The communication system 200 may be arranged in accordance with at least one embodiment described in the present disclosure. The communication system 200 may include one or more networks 202, a device 204, a device 206, a video mail messaging system 208 ("system 208"), and a telephone 210. In some embodiments, the communication system 200 may utilize WebRTC systems and protocols in the providing of video mail messaging services. Video mail messaging services may be similar to voicemail message services except that video mail messaging services may allow for audiovisual messages (referred to herein as "video mail messages") that include both video and audio to be recorded and shared.

The one or more networks 202 may be configured to communicatively couple the device 204, the device 206, the system 208, and the telephone 210. In some embodiments, the one or more networks 202 may be any network or configuration of networks configured to send and receive communications between systems and devices. In some embodiments, the one or more networks 202 may include a conventional type network, a wired or wireless network, and may have numerous different configurations. In some embodiments, the one or more networks 202 may also be coupled to or may include portions of a telecommunications network, including telephone lines, for sending data in a variety of different communication protocols, such as a POTS.

Each of the devices 204 and 206 and the telephone 210 may be or include any electronic or digital computing device. For example, each of the devices 204 and 206 and the telephone 210 may include a desktop computer, a laptop computer, a smartphone, a mobile phone, a tablet computer, a telephone, a phone console, or any other computing device. In some embodiments, each of the devices 204 and 206 and the telephone 210 may be configured to establish communication sessions with other devices. For example, each of the devices 204 and 206 and the telephone 210 may be configured to establish a communication session with another device over a telephone line or network. For example, the devices 204 and 206 may communicate over a wireless cellular network and the telephone 210 may communicate over a public switch telephone network (PSTN) line. Alternatively or additionally, the devices 204 and 206 and the telephone 210 may communicate over other wired or wireless networks that do not include or only partially include a PSTN. For example, a communication session between one or both of the devices 204 and 206 and the telephone 210 may be a VoIP telephone call. As another example, the communication session between one or both of the devices 204 and 206 and the telephone 210 may be an audiovisual communication session or other communication session. As another example, the communication session between one or both of the devices 204 and 206 and the telephone 210 may be an audiovisual message session of a video mail message, an audio message session, or other communication session.

Alternately or additionally, each of the devices 204 and 206 and the telephone 210 may be configured to communicate with other systems over a network, such as the one or more networks 202 or another network. In these and other embodiments, the devices 204 and 206 and the telephone 210 may receive data from and send data to the system 208. For example, the devices 204 and 206 and the telephone 210 may include memory and at least one processor, which are configured to perform operations as described in this disclosure, among other operations. In some embodiments, the devices 204 and 206 and the telephone 210 may include computer-readable instructions that are configured to be executed by the devices 204 and 206 and the telephone 210 to perform operations described in this disclosure.

In some embodiments, the system 208 may include any configuration of hardware, such as processors, servers, etc., that are networked together and configured to perform a task. For example, the system 208 may include multiple computing systems, such as multiple servers that each include memory and at least one processor, which are networked together and configured to perform operations related to providing video mail messaging services.

In some embodiments, the system 208 may operate as an exchange configured to establish communication sessions, such as telephone calls, video calls, etc., between devices such as the telephone 210 and another device or devices as described in this disclosure, among other operations. In some embodiments, the system 208 may include computer-readable instructions that are configured to be executed by the system 208 to perform operations described in this disclosure.

Further, as indicated above, in some embodiments, the system 208 may be configured to perform operations related to providing video mail messaging services. For example, in some embodiments, the system 208 may include a server system 240 that may include one or more servers. The server system 240 may include a capture provider 250 and a system WebRTC client 252a. Although the server system 240 is illustrated with one capture provider 250 and one system WebRTC client 252a, the server system 240 may include any number of capture providers 250 and system WebRTC clients 252a. The capture provider 250 may be similar or analogous to the capture provider 150 described above with respect to FIG. 1. Additionally, the system WebRTC client 252a may be similar or analogous to the WebRTC client 152 described above with respect to FIG. 1.

The system 208 may also include a database 242 in some embodiments. The database 242 may include any suitable computer-readable storage media configured to store data. For example, in some embodiments, the computer-readable storage media may include any available media that may be accessed by a general-purpose or special-purpose computer. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media.

Figure 4A:
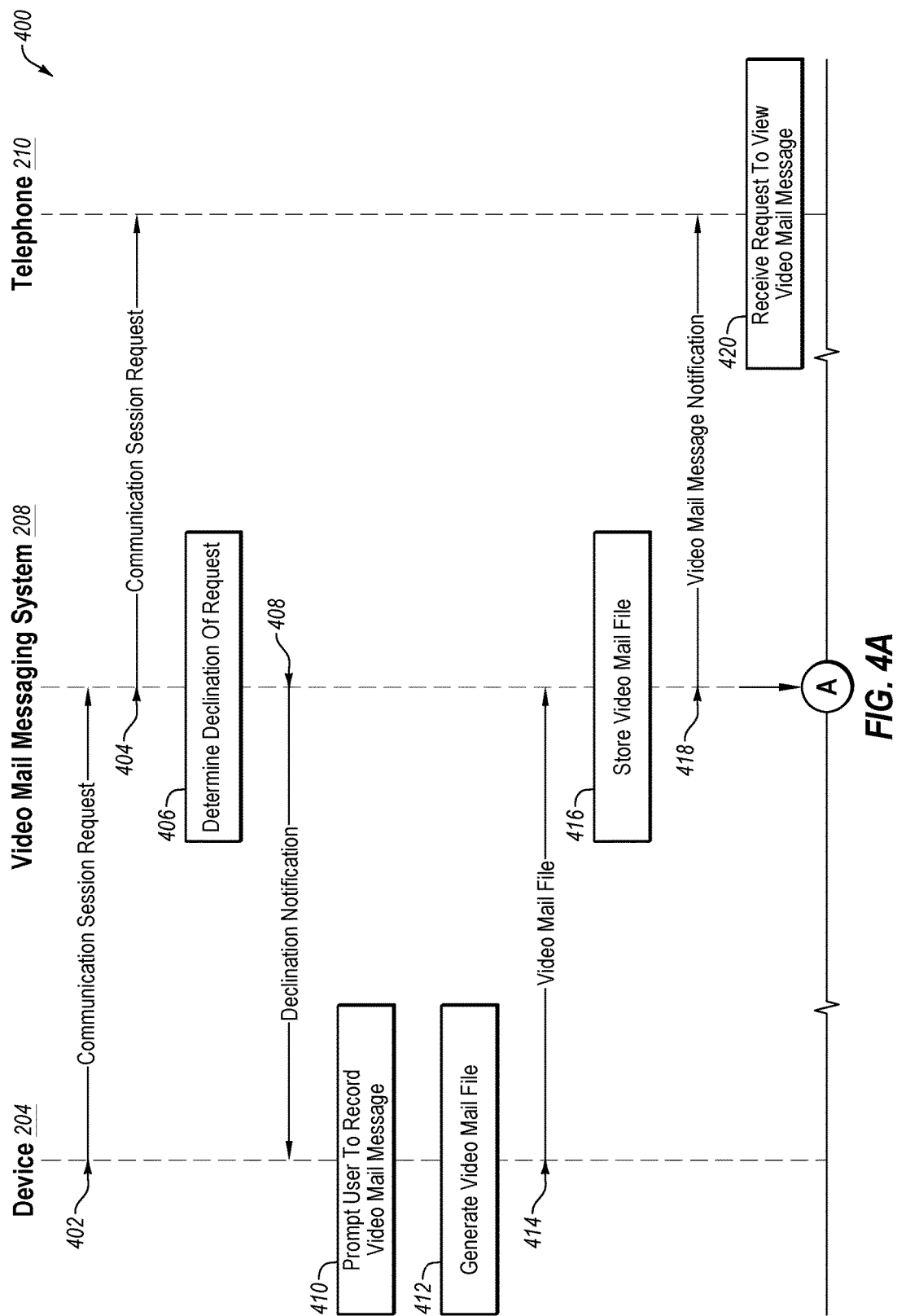
FIGS. 4A and 4B illustrates example operations that may be performed with respect to providing video mail messaging services.
Figure 4B:
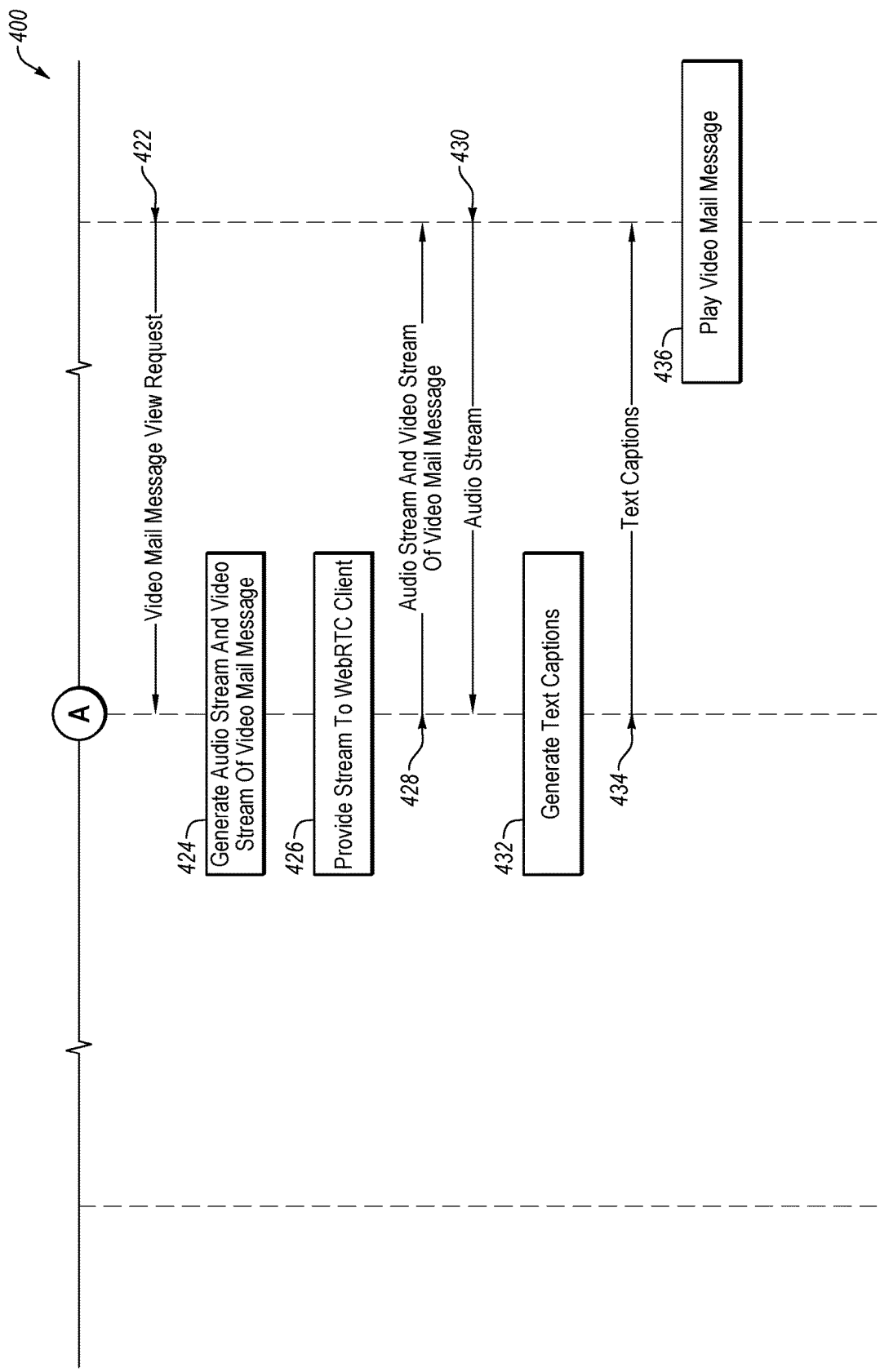

In some embodiments, the database 242 may include one or more video mail files stored thereon. In the illustrated example, the database 242 is illustrated as including a video mail file 254 that may be representative of the video mail files that may be stored on the database 242. The video mail file 254 may be an audiovisual file (e.g., the audiovisual file 154 of FIG. 1) of an audiovisual representation that may be a video mail message. The video mail file 254 may include an audio track 256 and a video track 258, that may be similar or analogous to the audio track 156 and the video track 158, respectively, of FIG. 1. The audio track 256 may include audio data of audio of the video mail message and the video track 258 may include video data of video of the video mail message. FIGS. 4A and 4B and there associated description provide further detail regarding example operations that may be performed by the system 208 with respect to providing video mail messaging services.

In some embodiments, the communication system 200 may be configured to facilitate an assisted communication session between a hearing-impaired user 216 or a hearing-impaired user 218 (such as a husband and wife who share a telephone 210) and a second user, such as the user 212 or the user 214. As used in the present disclosure, a "hearing-impaired user" may refer to a person with diminished hearing capabilities. Hearing-impaired users often have some level of hearing ability that has usually diminished over a period of time such that the hearing-impaired user can communicate by speaking, but that the hearing-impaired user often struggles in hearing and/or understanding others.

In some embodiments, the assisted communication session may be established between a device such as the device 204 or the device 206 and the telephone 210. In these embodiments, the telephone 210 may be a transcription telephone, such as a captioning telephone, that is configured to present transcriptions of the communication session to the hearing-impaired user 216 or the hearing-impaired user 218, such as one of the CaptionCall® 57T model family or 67T model family of captioning telephones or a device running the CaptionCall® mobile app. For example, in some embodiments, the telephone 210 may include a visual display 220 that is integral with the telephone 210 and that is configured to present text transcriptions of a communication session to the hearing-impaired user 216 or the hearing-impaired user 218. In these and other embodiments, the telephone 210 may be configured for use by multiple hearing impaired users using user profiles. For example, the telephone may be configured with a first user profile corresponding to the hearing-impaired user 216 and with a second user profile corresponding to the hearing-impaired user 218. Each user profile may include settings that are specific to the corresponding user, such as text size on the visual display 220, volume of the telephone 210, or user-specific ring-tones of the telephone 210, among other settings.

Alternatively or additionally, the telephone 210 may be associated with a visual display that is physically separate from the telephone 210 and that is in wireless communication with the telephone 210, such as a visual display of a wearable device 222 worn on the wrist of the hearing-impaired user 216 and configured to be in BlueTooth® wireless communication with the telephone 210. Other physically separate physical displays may be visual displays of desktop computers, laptop computers, smartphones, mobile phones, tablet computers, or any other computing devices that are in wireless communication with the telephone 210. The telephone 210 may also include a handset 224 and a switch hook 226.

During a transcription communication session, the system 208 and the device 204 or the device 206 and the telephone 210 may be communicatively coupled using networking protocols. In some embodiments, during the communication session between the device 204 or the device 206 and the telephone 210, the telephone 210 may provide the audio signal from the device 204 or the device 206 to the system 208 for transcription of the audio.

At the system 208, the audio signal may be transcribed. In some embodiments, to transcribe the audio signal, a call assistant may listen to the audio signal received from the device 204 or the device 206 and "revoice" the words of the user 212 or the user 214 to a speech recognition computer program tuned to the voice of the call assistant. In these and other embodiments, the call assistant may be an operator who serves as a human intermediary between the hearing-impaired user 216 or the hearing-impaired user 218 and the user 212 or the user 214. In some embodiments, text transcriptions may be generated by a speech recognition computer as a transcription of the audio signal of the user 212 or the user 214. The text transcriptions may be provided to the telephone 210 being used by the hearing-impaired user 216 or the hearing-impaired user 218 over the one or more networks 202. The telephone 210 may display the text transcriptions while the hearing-impaired user 216 or the hearing-impaired user 218 carries on a normal conversation with the user 212 or the user 214. The text transcriptions may allow the hearing-impaired user 216 or the hearing-impaired user 218 to supplement the voice signal received from the device 204 or the device 206 and confirm his or her understanding of the words spoken by the user 212 or the user 214.

In some embodiments, the telephone 210 may also include a user-device WebRTC client 252b that may be similar to the remote WebRTC client described above with respect to FIG. 1. Additionally, the telephone 210 may be an example of the remote system described with respect to FIG. 1. The user-device WebRTC client 252b may be configured to communicate with the system WebRTC client 252a using WebRTC protocols such that the video mail message of the video mail file 254 may be presented by the telephone 210. Additionally or alternatively, in some embodiments, the system 208 and the telephone 210 may be configured to perform one or more operations such that text transcriptions of the audio of the video mail message may be displayed during the presentation of the video mail message by the telephone 210. Further detail regarding the presentation of the video mail message and the text transcriptions is given below with respect to FIGS. 4A and 4B.

Modifications, additions, or omissions may be made to the communication system 200 without departing from the scope of the present disclosure. For example, in some embodiments, the user 212 or the user 214 may also be hearing-impaired. In these and other embodiments, the system 208 may provide text transcriptions to the device 204 or the device 206 based on audio data transmitted by the telephone 210. Alternately or additionally, the system 208 may include additional functionality. For example, the system 208 may edit the text transcriptions or make other alterations to the text transcriptions after presentation of the text transcriptions on the telephone 210. Alternately or additionally, in some embodiments, the communication system 200 may include additional devices similar to the devices 204 and 206 and the telephone 210. In these and other embodiments, the similar devices may be configured to automatically select a transport medium for a communication session. Further, in some embodiments, the system 208 may be configured to provide video mail messaging services but may not be configured to provide transcription services.

Figure 3:
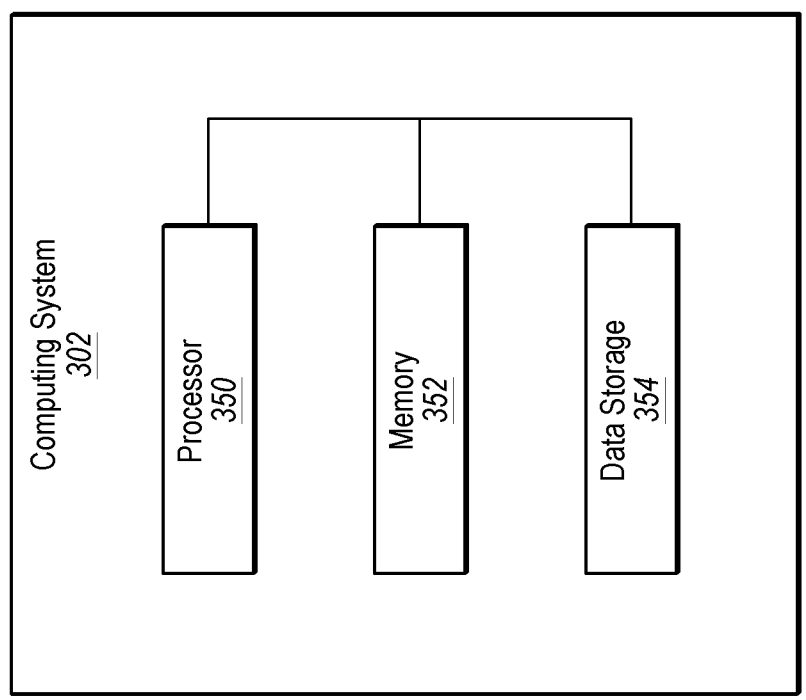
FIG. 3 illustrates a block diagram of an example computing system.

FIG. 3 illustrates a block diagram of an example computing system 302. The computing system 302 may be configured according to at least one embodiment of the present disclosure and may be configured to perform one or more operations related to performing WebRTC communications with respect to an audiovisual file. One or more variations of the computing system 302 may be included in the devices 204 and 206, the telephone 210, and the system 208 (including the server system 240) described with respect to FIG. 2. The computing system 302 may include a processor 350, a memory 352, and a data storage 354. The processor 350, the memory 352, and the data storage 354 may be communicatively coupled.

In general, the processor 350 may include any suitable special-purpose or general-purpose computer, computing entity, or processing device including various computer hardware or software modules and may be configured to execute instructions stored on any applicable computer-readable storage media. For example, the processor 350 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 3, the processor 350 may include any number of processors configured to, individually or collectively, perform or direct performance of any number of operations described in the present disclosure. Additionally, one or more of the processors may be present on one or more different electronic devices, such as different servers.

In some embodiments, the processor 350 may be configured to interpret and/or execute program instructions and/or process data stored in the memory 352, the data storage 354, or the memory 352 and the data storage 354. In some embodiments, the processor 350 may fetch program instructions from the data storage 354 and load the program instructions in the memory 352. After the program instructions are loaded into the memory 352, the processor 350 may execute the program instructions.

For example, in some embodiments, one or more capture providers and/or WebRTC clients may be included in the data storage 354 as program instructions. The processor 350 may fetch the program instructions from the data storage 354 and may load the program instructions in the memory 352. After the program instructions of the transcription modules are loaded into the memory 352, the processor 350 may execute the program instructions such that the computing system 302 may implement the operations associated with the capture providers and/or WebRTC clients as directed by the instructions.

The memory 352 and the data storage 354 may include computer-readable storage media for carrying or having computer-executable instructions or data structures stored thereon. Such computer-readable storage media may include any available media that may be accessed by a general-purpose or special-purpose computer, such as the processor 350. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 350 to perform a certain operation or group of operations. In some embodiments, the database 242 of FIG. 2 may be an example of the data storage 354.

Modifications, additions, or omissions may be made to the computing system 302 without departing from the scope of the present disclosure. For example, in some embodiments, the computing system 302 may include any number of other components that may not be explicitly illustrated or described.

FIGS. 4A and 4B illustrate example operations that may be performed with respect to providing video mail messaging services. The operations of FIGS. 4A and 4B may be arranged in accordance with at least one embodiment described in the present disclosure. The operations of FIGS. 4A and 4B may be implemented, in some embodiments, by a communication system such as the communication system 200 described with respect to FIG. 2. In some embodiments, the operations of FIGS. 4A and 4B may result from operations performed by a system based on instructions stored in one or more computer-readable media. Although illustrated as discrete operations, various operations may be divided into additional operations, combined into fewer operations, or eliminated, depending on the particular implementation. Additionally, to ease the explanation, the operations of FIGS. 4A and 4B are described with respect to the device 204, the system 208, and the telephone 210, as described in FIG. 2. However, the device 204 and the telephone 210 may be any devices that include WebRTC clients and that are configured to communicate with the system 208.

At an operation 402, the device 204 may attempt to establish a communication session with the telephone 210. For example, in some embodiments, the device 204 may direct a communication session request to the system 208 for the system 208 to relay the communication session request to the telephone 210. In these or other embodiments, the device 204 may direct the communication session request to the telephone 210 without involving the system 208.

At operation 404, the system 208 may relay the communication session request to the telephone 210 in response to receiving the communication session request from the device 204.

At operation 406, the system 208 may determine that the communication session request has been declined at the telephone 210. In some embodiments, the system 208 may determine that the communication session request has been declined in response to the telephone 210 not responding to the communication session request after a certain period of time. Reference to the telephone 210 not responding to the communication session request may indicate that the telephone 210 does not send back an indication that the telephone 210 was answered and does not necessarily mean that the telephone 210 did not provide some sort of notification (e.g., ring) that the a communication session request had been received by the telephone 210. In these or other embodiments, the system 208 may determine that the communication session has been declined in response to receiving an indication as such from the telephone 210. In other embodiments, the device 204 may determine that the communication session request has been denied in a similar manner.

At operation 408, the system 208 may communicate a notification of the declination of the communication session request to the device 204. In other embodiments, the device 204 may generate the declination notification in instances in which the device 204 may determine that the communication request has been declined.

At operation 410, the device 204 may be configured to prompt the user 212 if she desires to record a video mail message. In some embodiments, the device 204 may be configured to prompt the user 212 in response to the declination notification. At operation 412, the device 204 may generate a video mail file of a video mail message based on recorded audio and video of the user 212. In some embodiments, the video mail message may be designated for the hearing-impaired user 216 and/or the hearing-impaired user 218 based on the hearing-impaired user 216 and/or the hearing-impaired user 218 being associated with the telephone 210 and based on the communication session request being directed toward the telephone 210. At operation 414, the device 204 may communicate the video mail file to the system 208.

At operation 416, the system 208 may store the video mail file in the database 242. For example, the system 208 may store the video mail file as the video mail file 254 illustrated in FIG. 2.

At operation 418, the system 208 may communicate a video mail message notification to the telephone 210 to notify the hearing-impaired user 216 and/or the hearing-impaired user 218 of the video mail message. At operation 420, the telephone 210 may receive a request (e.g., through a user interface of the telephone 210 from the hearing-impaired user 216 and/or the hearing-impaired user 218) to view the video mail message associated with the video mail message notification. At operation 422, the telephone 210 may communicate a video mail message view request to the system 208 in response to receiving the request from the hearing-impaired user 216 and/or the hearing-impaired user 218 to view the video mail message at operation 420.

At operation 424, in response to receiving the request, the system 208 may be configured to access the video mail file 254 and generate an audio stream from the audio track 256 and generate a video stream from the video track 258. In some embodiments, the system 208 may be configured to synchronize the audio stream and the video stream to generate a corresponding audiovisual stream of the video mail message. Additionally or alternatively, in some embodiments, the system 208 may be configured to generate the audio stream, the video stream, and/or the audiovisual stream using the capture provider 250 according to the operations described above with respect to FIG. 1. Additionally or alternatively, the audiovisual stream may be provided to the system WebRTC client 252a at operation 426.

In some embodiments, the system WebRTC client 252a may establish a WebRTC communication session with the user-device WebRTC client 252b. In some embodiments, the system WebRTC client 252a may establish a WebRTC communication session with the user-device WebRTC client 252b prior to receiving the audiovisual stream.

At operation 428, the system WebRTC client 252a may communicate the audiovisual stream to the user-device WebRTC client 252b using WebRTC communication protocols. The user-device WebRTC client 252b may be configured to receive the audiovisual stream and to communicate the audio and video data included in the audiovisual stream to the appropriate elements of the telephone 210 such that the telephone 210 is able to reproduce and present the video mail message.

In some embodiments, the telephone 210 may be configured to communicate the audio stream or audio data back to the system 208 at operation 430. At operation 432, the system 208 may generate text transcriptions of the audio of the video mail message. In these and other embodiments, the system 208 may generate text transcriptions of the audio of the video mail message by using the received audio stream or audio data as an audio signal for which the text transcriptions may be generated, as described above with respect to FIG. 2. Additionally or alternatively, rather than the telephone 210 communicating the audio stream back to the system 208, the system 208 may multiplex the audio stream before sending the audiovisual stream to the telephone 210 and may perform the transcription operations based on the multiplexed audio stream.

At operation 434, the system 208 may communicate the text transcriptions to the telephone 210. At operation 436, the telephone 210 may present the video mail message. In some embodiments, the telephone 210 may present the text transcriptions during the presentation of the video mail message. Additionally or alternatively, in some embodiments, one or more of the operations 430, 432, and 434 may be performed while the video mail message is being presented at operation 436. As such, in some embodiments, the transcription of the video mail message may be performed in real-time or substantially real-time with respect to presentation of the video mail message.

Modifications, additions, or omissions may be made to FIGS. 4A and 4B without departing from the scope of the present disclosure. For example, as indicated in some examples above, the operations may be performed in differing order than as described. Further one or more operations may be performed at substantially the same time in some embodiments. Additionally, one or more of the operations described may be omitted in some instances or embodiments. Moreover, some of the operations may be performed by different components than as described in some embodiments and instances.

Figure 5:
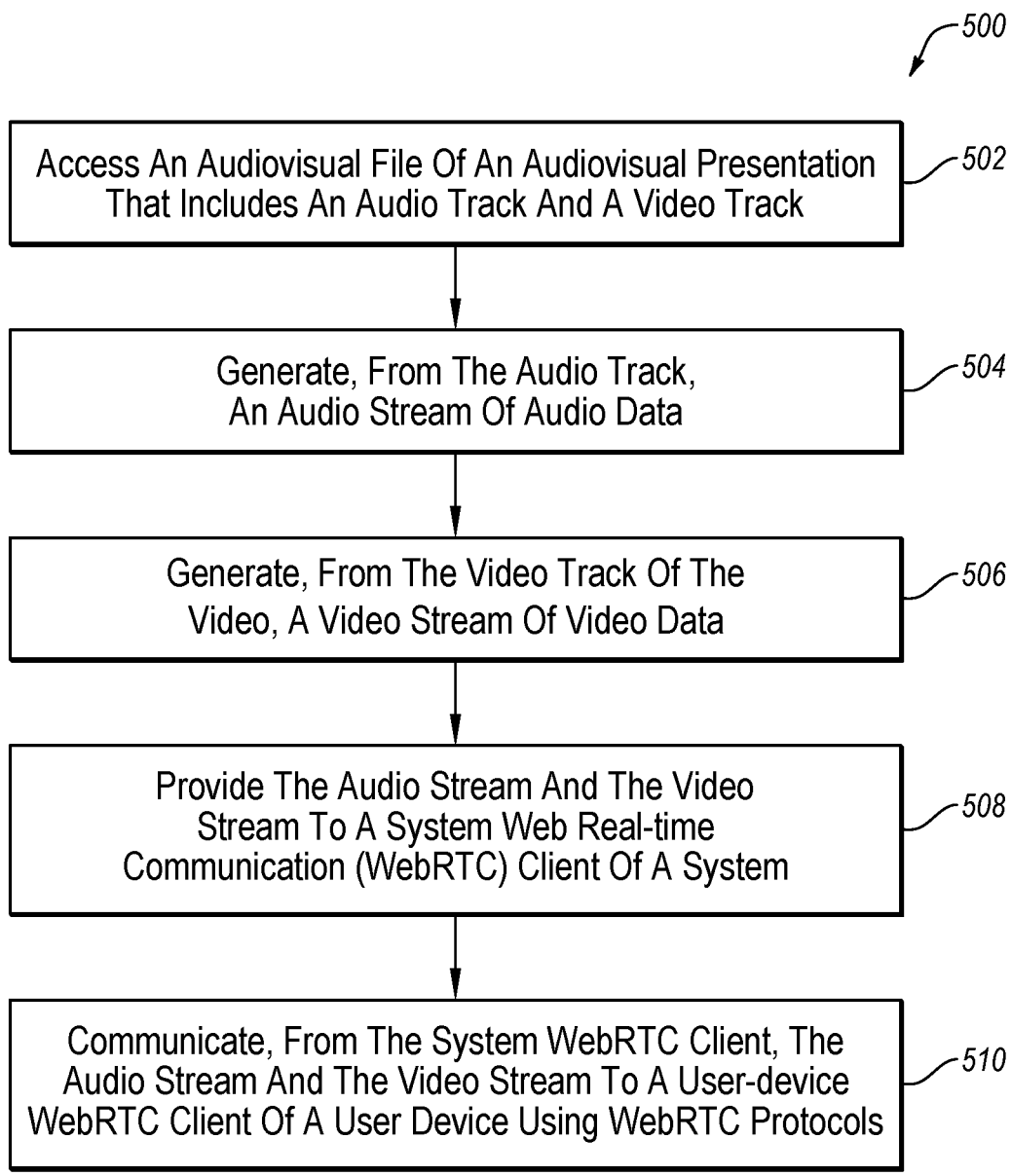
FIG. 5 is a flowchart of an example method to perform WebRTC communications with respect to an audiovisual file.

FIG. 5 is a flowchart of an example method 500 to perform WebRTC communications with respect to an audiovisual file. The method 500 may be arranged in accordance with at least one embodiment described in the present disclosure. The method 500 may be implemented, in some embodiments, by the environment 100 of FIG. 1 or the system 208 of FIG. 2. In some embodiments, the method 500 may result from operations performed by a system based on instructions stored in one or more computer-readable media. Although illustrated as discrete blocks, various blocks may be divided into additional blocks, combined into fewer blocks, or eliminated, depending on the particular implementation.

The method 500 may begin at block 502 where an audiovisual file of an audiovisual presentation may be accessed. The audiovisual file may include an audio track that includes audio data of audio of the audiovisual presentation and a video track that includes video data of video of the audiovisual presentation.

At block 504, an audio stream of the audio data of the audio track may be generated from the audio track. The audio stream may mimic the audio data as being sequentially obtained from audio being captured (e.g., via a microphone) in real-time. In some embodiments, the audio stream may be generated as described above with respect to the generation of the audio stream 166 of FIG. 1.

At block 506, a video stream of the video data of the video track may be generated from the video track. The video stream may mimic the video data as being sequentially obtained from video being captured (e.g., via a video camera) in real-time. In some embodiments, the video stream may be generated as described above with respect to the generation of the video stream 168 of FIG. 1.

At block 508, the audio stream and the video stream may be provided to a system WebRTC client of a system. In some embodiments, the audio stream and the video stream may be provided as separate streams but synchronized such that they are provided as an audiovisual stream such as described above with respect to the audiovisual stream 164 of FIG. 1.

At block 510, the audio stream and the video stream may be communicated (e.g., as the audiovisual stream) by the system WebRTC client to a user-device WebRTC client of a user device. The communicating of the audio stream and the video stream may be performed using WebRTC protocols. The communicating of the audio stream and the video stream may be such that the user device is able to present the audiovisual presentation based on the audio stream and the video stream. For example, the user-device WebRTC client may be configured to receive the audiovisual stream and to communicate the audio and video data included in the audiovisual stream to the appropriate elements of the user device such that the user device is able to reproduce and present the audiovisual presentation of the audiovisual file.

Modifications, additions, or omissions may be made to method 500 without departing from the scope of the present disclosure. For example, the functions and/or operations described may be implemented in differing order than presented or one or more operations may be performed at substantially the same time. Additionally, one or more operations may be performed with respect to each of multiple virtual computing environments at the same time. Furthermore, the outlined functions and operations are only provided as examples, and some of the functions and operations may be optional, combined into fewer functions and operations, or expanded into additional functions and operations without detracting from the essence of the disclosed embodiments. For example, in some embodiments, the method 500 may include operations related to the generation of text transcriptions of the audiovisual presentation. For instance, the method 500 may be used with respect to a video mail messaging service such as described above with respect to FIGS. 4A and 4B and one or more of the operations 430, 432, and 434 of FIGS. 4A and 4B or other of the operations of FIGS. 4A and 4B may be performed with respect to the method 500.

As indicated above, the embodiments described in the present disclosure may include the use of a special purpose or general purpose computer (e.g., the processor 350 of FIG. 3) including various computer hardware or software modules, as discussed in greater detail below. Further, as indicated above, embodiments described in the present disclosure may be implemented using computer-readable media (e.g., the memory 352 or data storage 354 of FIG. 3) for carrying or having computer-executable instructions or data structures stored thereon.

In some embodiments, the different components, modules, engines, and services described herein may be implemented as objects or processes that execute on a computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Additionally, although a lot of discussion is made in the present disclosure with respect to performing WebRTC communications with respect to audiovisual files is made in the context of video mail messaging services and systems, the concepts disclosed in the present disclosure are not limited to such uses. For example, the concepts related to generation of audio and video streams from audiovisual files and providing such streams to WebRTC clients to allow for the communication of associated audiovisual presentations may be applied in any number of situations outside of video mail messaging services. Furthermore, the concepts related to generation of audio and video streams from audiovisual files and providing such streams to WebRTC clients may be applied to data transfer protocols other than WebRTC.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used in the present disclosure to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A system comprising:
one or more computer-readable storage media having instructions stored thereon; and
one or more processors communicatively coupled to the one or more computer-readable storage media and configured to, in response to execution of the instructions, cause the system to perform operations comprising:
receiving, from a first user device of a first user, a video mail file of a video mail message designated as being for a second user, the video mail file including an audio track that includes audio data of audio of the video mail message and a video track that includes video data of video of the video mail message;
storing the video mail file in a database;
receiving, from a second user device of the second user, a request to view the video mail message; and
in response to receiving the request to view the video mail message:
generating, from the audio track of the video mail file stored in the database, an audio stream of the audio data, the audio stream having a streaming characteristic that resembles a streaming characteristic of the audio data being sequentially obtained from audio being captured by a microphone in real-time;
generating, from the video track of the video mail file stored in the database, a video stream of the video data, the video stream having a streaming characteristic that resembles a streaming characteristic of the video data being sequentially obtained from images being captured by a video camera in real-time;
providing the audio stream and the video stream to a system Web Real-Time Communication (WebRTC) client of the system;
communicating, from the system WebRTC client, the audio stream and the video stream to a user-device WebRTC client of the second user device using WebRTC protocols such that the second user device is able to present the video mail message based on the audio stream and the video stream;
receiving the audio stream back from the second user device;

generating a plurality of text transcriptions of the audio of the video mail message based on the audio stream received back from the second user device; and providing the plurality of text transcriptions to the second user device while the second user device is presenting the video mail message for presentation of the text transcriptions in real-time with the presentation of the video mail message by the second user device.

2. The system of claim 1, wherein the operations further comprise establishing a WebRTC connection between the system WebRTC client and the user-device WebRTC client in response to receiving the request to view the video mail message.

3. The system of claim 1, wherein the operations further comprise:

receiving, from the first user device, a communication session request intended for the second user device;

communicating the communication session request to the second user device in response to the communication session request being intended for the second user device;

determining a declination of the communication session request at the second user device;

communicating a declination notification to the first user device in response to determining the declination of the communication session request; and receiving the video mail file from the first user device based on the declination notification.

4. The system of claim 3, wherein the first user device is configured to prompt the first user to record the video mail message in response to receiving the declination notification.

5. The system of claim 3, wherein the operations further comprise determining the declination of the communication session request in response to the second user device not responding to the communication session request.

6. The system of claim 1, wherein the video mail file includes recorded audio and video of the first user.

7. The system of claim 1, wherein the first user device is configured to present text transcriptions received from the system.

8. A method comprising:

receiving, from a first user device of a first user, a video mail file of a video mail message designated as being for a second user, the video mail file including an audio track that includes audio data of audio of the video mail message and a video track that includes video data of video of the video mail message;

storing the video mail file in a database;

receiving, from a second user device of the second user, a request to view the video mail message; and in response to receiving the request to view the video mail message:

generating, from the audio track of the video mail file stored in the database, an audio stream of the audio data, the audio stream having a streaming characteristic that resembles a streaming characteristic of the audio data being sequentially obtained from audio being captured in real-time;

generating, from the video track of the video mail file stored in the database, a video stream of the video data, the video stream having a streaming characteristic that resembles a streaming characteristic of the video data being sequentially obtained from video being captured in real-time;

providing the audio stream and the video stream to a system Web Real-Time Communication (WebRTC) client; and communicating, from the system WebRTC client, the audio stream and the video stream to a user-device WebRTC client of the second user device using WebRTC protocols such that the second user device is able to present the video mail message based on the audio stream and the video stream.

9. The method of claim 8, further comprising:

generating a plurality of text transcriptions of the audio of the video mail message based on the audio stream; and providing the plurality of text transcriptions to the second user device while the second user device is presenting the video mail message.

10. The method of claim 8, further comprising establishing a WebRTC connection between the system WebRTC client and the user-device WebRTC client in response to receiving the request to view the video mail message.

11. The method of claim 8, further comprising:

receiving, from the first user device, a communication session request intended for the second user device;

communicating the communication session request to the second user device in response to the communication session request being intended for the second user device;

determining a declination of the communication session request at the second user device;

communicating a declination notification to the first user device in response to determining the declination of the communication session request; and receiving the video mail file from the first user device based on the declination notification.

12. The method of claim 11, wherein the first user device is configured to prompt the first user to record the video mail message in response to receiving the declination notification.

13. The method of claim 11, further comprising determining the declination of the communication session request in response to the second user device not responding to the communication session request.

14. The method of claim 8, wherein the video mail file includes recorded audio and video of the first user.

15. At least one non-transitory computer-readable media configured to store one or more instructions that in response to being executed by at least one computing system cause performance of operations comprising:

receiving, from a first user device of a first user, a video mail file of a video mail message designated as being for a second user, the video mail file including an audio track that includes audio data of audio of the video mail message and a video track that includes video data of video of the video mail message;

storing the video mail file in a database;

receiving, from a second user device of the second user, a request to view the video mail message; and in response to receiving the request to view the video mail message:

generating, from the audio track of the video mail file stored in the database, an audio stream of the audio data, the audio stream having a streaming characteristic that resembles a streaming characteristic of the audio data being sequentially obtained from audio being captured in real-time;

generating, from the video track of the video mail file stored in the database, a video stream of the video data, the video stream having a streaming characteristic that resembles a streaming characteristic of the video data being sequentially obtained from video being captured in real-time;

providing the audio stream and the video stream to a system Web Real-Time Communication (WebRTC) client; and communicating, from the system WebRTC client, the audio stream and the video stream to a user-device WebRTC client of the second user device using WebRTC protocols such that the second user device is able to present the video mail message based on the audio stream and the video stream.

16. The at least one non-transitory computer-readable media of claim 15, wherein the operations further comprise:

generating a plurality of text transcriptions of the audio of the video mail message based on the audio stream; and providing the plurality of text transcriptions to the second user device while the second user device is presenting the video mail message.

17. The at least one non-transitory computer-readable media of claim 15, wherein the operations further comprise establishing a WebRTC connection between the system WebRTC client and the user-device WebRTC client in response to receiving the request to view the video mail message.

18. The at least one non-transitory computer-readable media of claim 15, wherein the operations further comprise:

receiving, from the first user device, a communication session request intended for the second user device;

communicating the communication session request to the second user device in response to the communication session request being intended for the second user device;

determining a declination of the communication session request at the second user device;

communicating a declination notification to the first user device in response to determining the declination of the communication session request; and receiving the video mail file from the first user device based on the declination notification.

19. The at least one non-transitory computer-readable media of claim 18, wherein the first user device is configured to prompt the first user to record the video mail message in response to receiving the declination notification.

20. The at least one non-transitory computer-readable media of claim 15, wherein the video mail file includes recorded audio and video of the first user.

* * * * *